United States Patent [19]

Takahashi

[11] Patent Number: 4,650,708

[45] Date of Patent: Mar. 17, 1987

[54] MAGNETIC RECORDING MATERIAL AND A METHOD FOR PRODUCING THE SAME

[76] Inventor: Toshiro Takahashi, 350-29, Oosechou, Hamamatsu-shi, Shizuoka-ken, Japan

[21] Appl. No.: 612,679

[22] Filed: May 22, 1984

[30] Foreign Application Priority Data

May 28, 1983 [JP] Japan ............................ 58-94734
Jul. 28, 1983 [JP] Japan ........................... 58-138636
Nov. 2, 1983 [JP] Japan ........................... 58-206378

[51] Int. Cl.$^4$ .................... G11B 5/64; H01F 10/26
[52] U.S. Cl. .................................. 428/216; 204/35.1; 204/37.6; 204/42; 360/131; 360/135; 427/129; 427/130; 427/131; 428/307.3; 428/314.2; 428/318.4; 428/336; 428/469; 428/694; 428/900
[58] Field of Search ............... 360/131, 135; 204/42, 204/35.1, 37.6; 428/694, 178, 216, 336, 469, 900, 307.3, 314.2, 318.4; 427/129, 130, 131

[56] References Cited

U.S. PATENT DOCUMENTS

| | | | |
|---|---|---|---|
| 3,554,798 | 1/1971 | Nacci | 360/131 |
| 3,886,052 | 5/1975 | Smith | 204/42 |
| 4,109,287 | 8/1978 | Kawai et al. | 360/131 |
| 4,393,110 | 7/1983 | Fukuda | 428/694 |
| 4,430,387 | 2/1984 | Nakagawa et al. | 360/135 |
| 4,548,682 | 10/1985 | Yoshida et al. | 204/35.1 |
| 4,563,397 | 1/1986 | Ishigura et al. | 428/469 |

FOREIGN PATENT DOCUMENTS 15597 5/1976 Japan .
94104 8/1977 Japan .
23207 7/1981 Japan .

OTHER PUBLICATIONS

"Thin Film Flexible Magnetic Media", Depew et al, IBM Technical Disclosure Bull., vol. 24, No. 10, Mar. 82.

Primary Examiner—George F. Lesmes
Assistant Examiner—William M. Atkinson
Attorney, Agent, or Firm—Lerner, David, Littenberg, Krumholz & Mentlik

[57] ABSTRACT

In production of a magnetic recording material which accumulates information in magnetic substance packed in micro pores extending in the thickness direction of an anodic oxide surface layer formed on an aluminum foil by anodic oxidation and electrolylic deposition, ferromagnetic substance such as Fe—Co—Ni alloys is used for packing and the pore diameter is adjusted to a range from 40 to 100 nm in order to obtain highly improved magnetic characteristics which enable high density magnetic recording.

9 Claims, 25 Drawing Figures

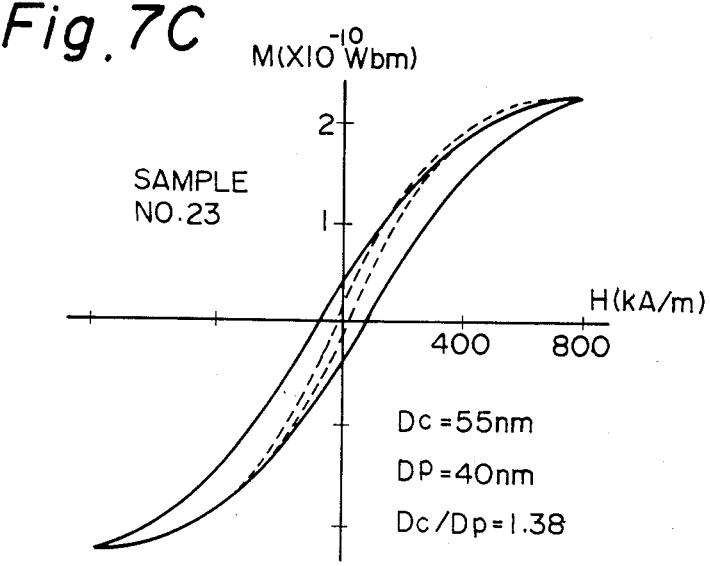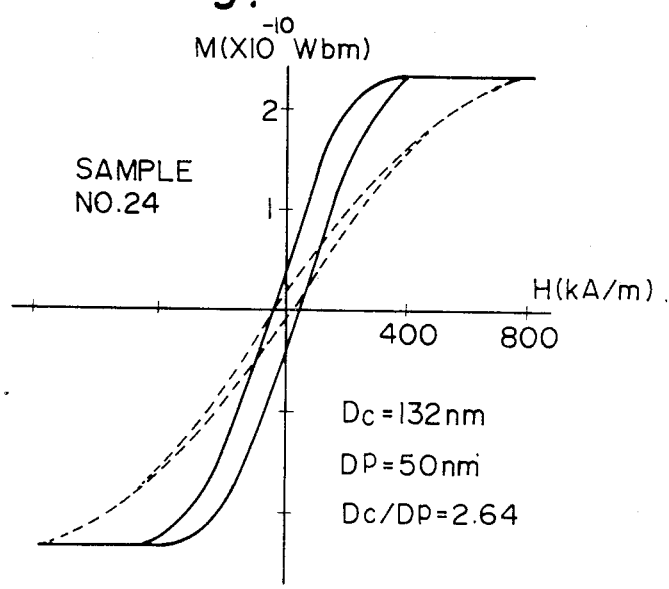

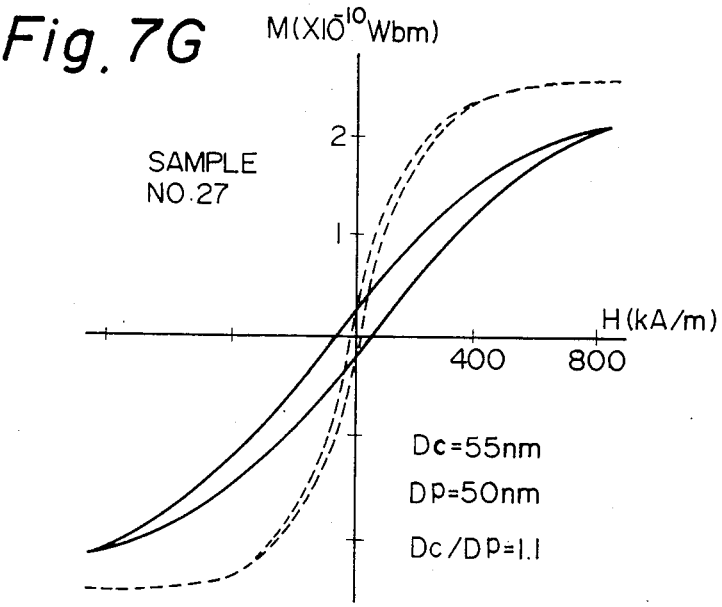
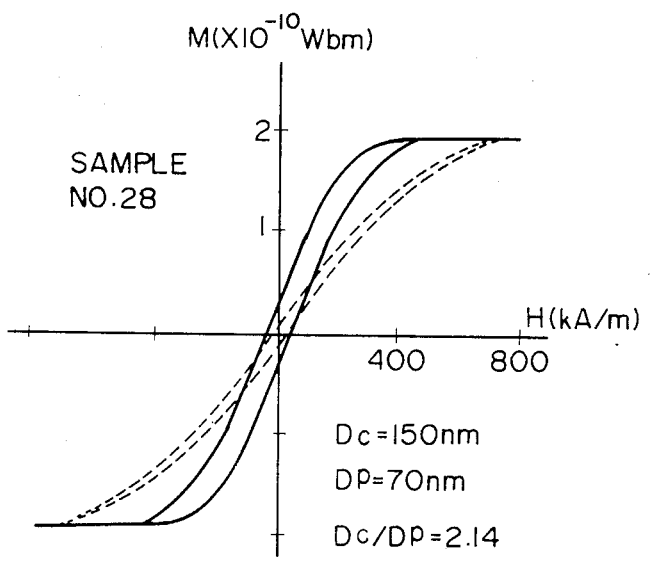

MAGNETIC RECORDING MATERIAL AND A METHOD FOR PRODUCING THE SAME

BACKGROUND OF THE INVENTION

The present invention relates to an improved magnetic recording material and a method for producing the same, and more specifically relates to production of a magnetic recording material in which information is accumulated in magnetic substance packed in micro pores extending in the thickness direction of the material.

Thickness directional magnetic recording of this type is known to be suited for high density recording in which a great deal of information (bits) is stored in a very small area of a magnetic recording medium of a memory.

One example of the production of such a high density magnetic recording material is disclosed in U.S. Pat. No. 4,109,287. In the process of this proposed system, a layer having a great number of micro pores, which extend in the thickness direction of the layer, is formed on the surface of a substrate containing predominant amount of aluminum by anodic oxidation (the first electrolytic treatment) and magnetic substance is packed in the micro pores by electrolytic deposition (the second electrolytic treatment).

In the construction of the magnetic recording material produced by this proposed system, the diameter of the micro pores in the anodic oxide layer varies generally within a range from 10 to 40 nm (nanometers). When the magnetic substance is packed in the micro pores of such a small diameter, the resultant magnetic recording material exhibit a high coercive force in the thickness direction which amounts to 120,000 A/m or higher. When recording and erasing of information are performed using a magnetic recording material of such a high coercive force with a narrow head gap, magnetic saturation takes place at the tip of the magnetic head and, as a consequence, the magnetic recording material of the above-described earlier proposal is quite unsuited for high density recording. Even when the coercive force of the resultant magnetic material is occasionally below 120,000 A/m, the easily magnetizable direction is almost parallel to the surface of the magnetic recording material and, therefore, it is next to impossible to accumulate information in the axial direction of the magnetic substance packed in the micro pores. Further, even when the easily magnetizable direction is somewhat normal to the surface of the magnetic recording material, the resultant residual magnetic flux density is lower than 0.03T which value disenables generation of sufficient reproduction output. These factors all concur to make the magnetic recording material of the earlier proposal quite unsuited for use in high density magnetic recording.

In addition to the foregoing, the accumulating capacity of information of the magnetic recording material is significantly swayed by the rate of packing of the magnetic substance in the micro pores. As a result of a series of confirmation tests conducted by the inventor of the present invention, it was confirmed that the process of the abovedescribed earlier proposal cannot always assure full packing of the magnetic substance in the micro pores.

SUMMARY OF THE INVENTION

It is the basic object of the present invention to produce a magnetic recording material having a controlled level of coercive force, an easily magnetizable direction substantially normal to its surface and ideal recording and reproducing characteristics which are suited for high density magnetic recording.

It is another object of the present invention to raise the accumulating capacity of information of a magnetic recording material to a possible maximum extent.

In accordance with the basic aspect of the present invention, a magnetic recording material is provided with a great number of micro pores of a diameter in a range from 40 to 100 nm which extend in the thickness direction of an anodic oxide surface layer formed in the surface section of a substrate containing predominant amount of aluminum, and ferromagnetic substance closely packed in the micro pores.

In accordance with another aspect of the present invention, an anodic oxide layer having a great number of micro pores is formed on an aluminum or aluminum alloy substrate by anodic oxidation, and, in advance to packing of ferromagnetic substance in the micro pores by electrolytic deposition, enlargement of the micro pores is carried out by first advancing electrolysis with small constant electric current, secondly converting the mode of electrolysis to one with constant electric voltage when the electrolytic voltage has dwindled down to a prescribed level and, thirdly, ceasing the electrolysis after the electric current is stabilized.

BRIEF DESCRIPTION OF THE DRAWINGS

FIGS. 7A to 7M are graphs for showing hysteresis behaviours of magnetic recording materials of various ratios of cell diameter with respect to pore diameter.

DESCRIPTION OF THE PREFERRED EMBODIMENTS

Figure 1:
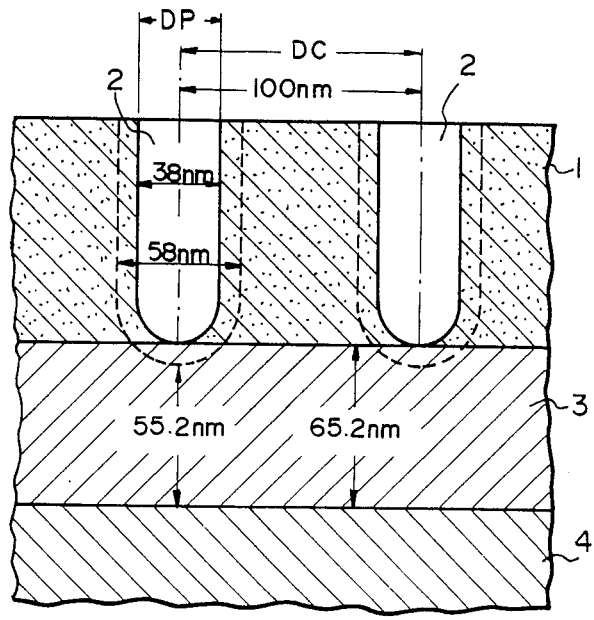
FIG. 1 is an enlarged side sectional view of the magnetic recording material in accordance with the present invention.

In production of the magnetic recording material in accordance with the present invention, the following points have to be taken into consideration.

The first point concerns the value of the coercive force to be possessed by the produced magnetic recording material. That is, the value of the coercive force should be adjusted so that no magnetic saturation should occur at the tip of a magnetic head when recording and erasing is carried out with a narrow head gap for high density recording. Further, the value of the coercive force should be adjusted so that the resultant residual magnetic flux density should allow generation of sufficiently large reproduction output.

The second point concerns the thickness of the anodic oxide layer. The thickness of the anodic oxide layer should be adjusted so that the easily magnetizable direction should be substantially normal to the surface of the magnetic recording material. The thickness of the anodic oxide layer should further be adjusted so that the produced magnetic recording material should exhibit otpimum recording and reproducing characteristics in actual use.

Taking these points into consideration, it was confirmed by the inventor of the present invention that the quality of the produced magnetic recording material is greatly swayed by the diameter of the micro pores in the anodic oxide surface layer and the kind of the magnetic substance to be packed in the micro pores. It was also confirmed that the thickness of the anodic oxide surface layer is a collateral factor to effect the quality of the produced magnetic recording material.

Reverting to the first factor, the diameter of the micro pores should be in a range from 40 to 100 nm, and more preferably in a range from 40 to 75 nm. Choice of the pore diameter is closely related to the head gap and the thickness of the anodic oxide surface layer. When the layer thickness is in a range from 0.5 to 3.0 $\mu$m, pore diameters in a range from 40 to 100 nm brings about a coercive force in a range from 86,740 to 21,490 A/m, and coercive force in such range is small enough to make the easily magnetizable direction to be substantially normal to the surface of the magnetic recording material. When the pore diameter falls short of 40 nm, the coercive force becomes larger than 80,000 A/m which disenables smooth writing by generally used ferrite heads and makes the easily magnetizable direction be substantially parallel to the surface of the magnetic recording material.

Regarding the second factor, the kind of the magnetic sustance to be packed in the micro pores in the anodic oxide surface layer, it was confirmed that use of ferromagnetic substances brings about a good result. Such ferromagnetic substance includes Fe or alloys including 50% by weight or more of Fe. More specifically, Fe—Co alloys, Fe—Ni alloys and Fe—Co—Ni alloys are advantageously used for the purpose of the present invention.

The thickness of the anodic oxide surface layer, the collaterial factor, should preferably be in a range from 0.5 to 3.0 $\mu$m. When the thickness exceeds the upper limit, there is no noticiable increase in the reproduction output and the limit recording density is rather lowered. This lowering is assumed to be caused by the fact that, at high density recording of about 1.5 $\mu$m wave length, thickness or normal directional magnetization by signals takes place in the section close to the surface of the magnetic recording material only and surface or horizontal directional magnetization may occur in the deep sections.

Production of the magnetic recording material in accordance with the present invention includes three major steps, i.e. formation of micro pores, enlargement of the pore diameter and deposition of the ferromagnetic substance. First, anodic oxidation treatment is applied in a known manner to a foil made of aluminum or an aluminum alloy for formation, in the surface section thereof, of an anodic oxide surface layer having a number of micro pores extending in its thickness direction. Next, the foil having such an anodic oxide layer is immersed in a bath containing a mixture of sulfamic acid with phosphoric acid for enlargement of the pore diameter. Adjustment of the pore diameter is effected by varying the period of immersion. Thirdly, the foil is subjected to electrolytic deposition in a aqueous solution containing metallic salt of ferromagnetic substance such as Fe—Co alloy, Fe—Ni alloy or Fe—Co—Ni alloy which contains 50% by weight or more of Fe for deposition of the ferromagnetic substance in the micro pores formed in the anodic oxide surface layer of the foil. Adjustment in thickness of the anodic oxide surface layer is effected either by varying the process conditions at the first anodic oxidation treatment or by applying grinding to the surface of the foil after the final deposition of the ferromagnetic substance.

The magnetic recording material produced by the above-described process exhibits a coercive force in a range from 32,000 to 120,000 A/m which brings about an easily magnetizable direction substantially normal to the surface of the magnetic recording material. The product also possesses highly excellent recording and reproducing characteristics well suited for high density recording.

As a result of a further study of the mechanism conducted by the inventor of the present invention, it was confirmed that the distance between adjacent micro pores and the pore diameter in combination more or less influence easiness in writing at the adjacent micro pores, magnetic interaction at magnetization between the adjacent micro pores and the mode of easily magnetizable direction. In this regard, the distance between the adjacent micro pores is given in the form of the distance between the center axes of the adjacent micro pores and such an inter-axis distance is generally referred to as "the cell diameter". The ratio of the cell diameter (Dc) with respect to the pore diameter (Dp) is used for evaluation of such an influence. More specifically, when the pore diameter (Dp) is in a range from 40 to 50 nm, the value of the ratio (Dc/Dp) should preferably be in a range from 1.4 to 2.7. Whereas, when the pore diameter (Dp) is in a range from 50 to 100 nm, the value of the ratio (Dc/Dp) should preferably be in a range from 1.4 to {2.7−(1.2/50 nm) (Dp−50 nm)}. Any ratio falling within the above-described ranges assures smooth writing at adjacent micro pores, avoids undesirable interaction at magnetization and makes the easily magnetizable direction to be substantially normal to the surface of the produced magnetic recording material.

Further, the inventor's study was directed to the mode of packing of the ferromagnetic substance into the micro pores formed in the anodic oxide surface layer of the foil. As a result, it was confirmed through electromicroscopic investigation that the rate of packing is dependent upon the pore occupation rate and the thickness of the anodic oxide surface layer. More specifically, the larger the layer thickness and the larger the pore occupation rate, the smaller the rate of packing. It was further confirmed that metal crystals separated at the electrolytic treatment in the micro pores are significantly different in length.

Pore packing of the ferromagnetic substance and variable length of the material crystal tend to cause, in actual use of the magnetic recording material, poor uniformity in magnetic characteristics of the ferromagnetic particles forming unit reservoirs of information and variation in distance between the ferromagnetic unit reservoirs and the magnetic head scanning the magnetic magnetic recording material. In order to avoid such inconvenienceies, the surface of the foil has to be removed by grinding a great deal, which connects to low yield in the production.

During formation of the anodic oxide surface layer in the surface section of a foil, a barrier layer is concurrently formed beneath the anodic oxide layer whose thickness is generally in a range from 1.3 to 1.5 nm per V of the applied bath electric voltage. Electrolytic deposition of the ferromagnetic substance in the micro pores is caused by passage of the electric current through the above-described barrier layer just beneath the bottom of the micro pores. The barrier layer is basically an insulator and the above-described thickness range shows a critical limit for passage of electric current. In order to cause smooth electrolytic deposition of the ferromagnetic substance at the anodic oxidation treatment, the electric voltage to be applied to the system should be adjusted higher than such a critical limit derived from the thickness of the barrier layer to be developed by the treatment. When the electric voltage falls short of such a critical limit, there cannot be a sufficient passage of the electric current through the barrier layer.

Thus, the study was focussed upon the corelationship between the electric voltage at the electrolytic deposition, the thickness of the barrier layer and the rate of packing of the ferromagnetic substance. As a result, it was confirmed that the rate of packing of the ferromagnetic substance in the micro pores is greatly swayed by the thickness of the barrier layer developed at the anodic oxidation treatment.

When the thickness of the barrier layer is in a range from 8 to 28 nm, the electric current flowing during the electrolysis is effectively used for deposition of the metallic salt of the ferromagnetic substance by reduction. However, any barrier layer thickness outside the above-described range would cause gas envelovement or deposition of the ferromagnetic substance outside the micro pores, thereby disenabling efficient packing of the ferromagnetic substance within the micro pores.

Now, if it is assumed that the pore diameter obtained should be 58 nm, then the appropriate value for the cell diameter, i.e. the distance between the center axes of adjacent micro pores, is in the range of 81.2 to 145.5 nm, which values are determined from the above-mentioned relationship between the pore diameter and cell diameter. From such a range, a value of 100 nm for example has been selected. That is, the pore diameter (Dp) of 58 nm and the cell diameter (Dc) of 100 nm should appropriately be obtained. For this purpose, the value of the bath electric voltage (VDc) to be applied is calculated as follows;

$$VDc = 100 \div 2.3 \approx 43(V)$$

Then, the corresponding barrier layer thickness is calculated as follows;

$$43(V) \times 1.5 \text{ (nm)}/(V) = 65.2 \text{ (nm)}$$

The pore diameter (Dp) is given in the form of (DC × k), k being a constant equal to 0.38. So, when the cell diameter is equal to 100 nm, the corresponding pore diameter is equal to 38 nm. Thus, in order to obtain a cell diameter (Dc) equal to 100 nm with an electric voltage equal to 43 V, the diameter (Dp) of micro pores 2 in an anodic oxide surface layer 1 is equal to 38 nm and the thickness of a barrier layer 3 on an aluminum substrate 4 is equal to 65.2 nm as shown in FIG. 1.

In order to attain the appropriate value of 58 nm for the pore diameter, the initial micro pores are enlarged as shown with dot lines by immersing the foil in a bath containing a mixture of sulfamic acid with phosphoric acid. Even after this enlargement of the micro pores, the barrier layer still has a thickness of about 55.2 nm.

As a consequence, the thickness of the barrier layer should further be reduced to the range from 8 to 28 nm after the enlargement of the micro pores in order to obtain appreciable rate of packing of the ferromagnetic substance in the micro pores.

Figure 2:
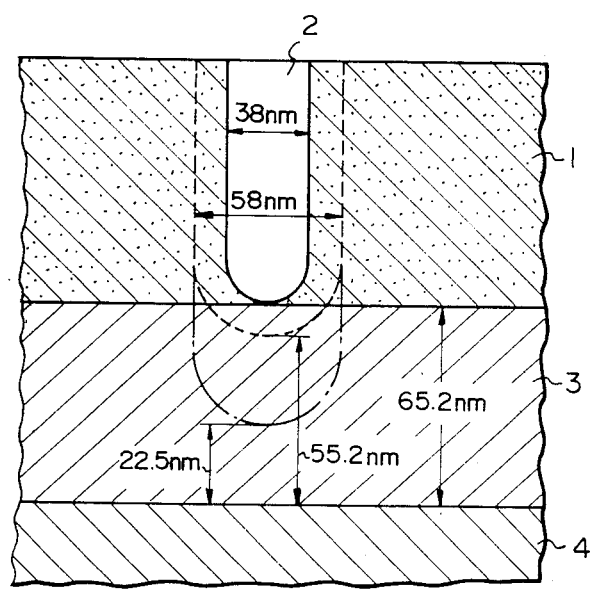
FIG. 2 is an enlarged side sectional view for showing solution occuring on the wall of a micro pore at enlargement of the micro pore by electrolysis.

To this end, the mode of solution on the wall of each micro pore at the enlargement of the initial micro pore was investigated by electromicroscopic observation. As a result, it was confirmed that, as shown in FIG. 2, solution on the wall section close to the aluminum substrate 4 is faster than that on the wall section remote from the aluminum substrate, as time passes. This is believed to be caused by the fact that solution of the barrier layer lowers the electric resistance around the bottom of the micro pore and increased passage of the electric current promotes further solution of the bariier layer. The extent of this promotion of solution varies depending on the electric voltage and the period of the electrolysis.

Starting from this point of view, the inventor of the present invention conducted a series of experiments in order to adjust the thickness of the barrier layer. As a result, it was confirmed that maximum rate of packing can be obtained when, in enlargement of the micro pores, electrolysis is first carried out with small constant electric current. When the electrolytic voltage dwindles down to a prescribed value as time passes, electrolysis is next carried out with constant electric voltage. Finally, electrolysis is ceased when electric current is stabilized.

EXAMPLES

Example 1

Ten samples Nos. 1 to 10 were prepared by varying the period of immersion at enlargement of the micro pore diameter.

For each sample, an aluminum foil of 99.99% purity and 95 μm thickness was used.

Anodic oxidation was carried out using an oxalic acid solution of 3% by weight concentration.

Pore diameter enlargement was carried out by immersing each foil in a solution bath containing 5% by weight of sulfamic acid and 0.8% by weight of phoshoric acid at 20° C. The period of immersion was changed from 20 to 200 min in the ten samples.

Packing of ferromagnetic substance (Fe) was carried out in an electrolytic solution containing 50 g/l of ammonium iron sulfate, 30 g/l of boric acid and 2 g/l of glycerin at 20° C. using asymmetric alternating current. The negative side peak current density was 0.8 A/dm$^2$, the positive side peak current density was 0.3 A/dm$^2$, and these peak current densities were maintained constant throughout the electrolytic deposition treatment. The PH of the electrolytic solution was adjusted to 4.0. After complete electrolytic deposition of Fe in the micro pores of the foil, coersive force Hc, residual magnetic flux density Br and saturated magnetic flux density Bs, all in directions normal and parallel to the surface of each magnetic recording material, were measured. The obtained results are shown in Table 1. In the table, the word "normal" is used for values taken in a direction

Example 3

Starting from aluminum foils same as those used in Example 1, five samples Nos. 16 to 20 were prepared varying the period of immersion at pore diameter enlargement. Anodic oxidation and pore diameter enlargement were carried out in a manner same as that employed in Example 1. The period of immerson was changed from 20 to 160 min in these five samples.

Packing of ferromagnetic substance (50 Fe—50 Ni alloy) was carried out in an electrolytic solution containing 20 g/l of iron sulfate, 40 g/l of nickel sulfate, 30 g/l of boric acid and 2 g/l of glycerin. The PH of the electrolytic solution was adjusted to 5.0.

Like Example 1, coercive force Hc, residual magnetic flux density Br and saturated magnetic flux density Bs, all in the normal and parallel directions, were measured and the obtained results are shown in Table 1.

TABLE 1

| sample No. | Anodic oxidation voltage (V) | Anodic oxidation temperature (°C.) | Anodic oxidation period (min) | period of electrolysis at pore diameter enlargement (min) | period of electrolytic deposition at packing (min) | mechanical properties thickness of anodic oxide layer (μm) | pore diameter (nm) | Hc (kA/m) ⊥ | Hc (kA/m) = | Br (mT) ⊥ | Br (mT) = | Bs (mT) = |
|---|---|---|---|---|---|---|---|---|---|---|---|---|
| 1 | 30 | 20 | 30 | 20 | 20 | 3.0 | 25 | 147.2 | 31.8 | 95.0 | 12.2 | 205 |
| 2 | 48 | 20 | 10 | 40 | 21 | 3.1 | 44 | 73.2 | 28.6 | 66.7 | 12.0 | 209 |
| 3 | 48 | 20 | 10 | 60 | 25 | 3.1 | 50 | 59.7 | 32.6 | 51.3 | 13.1 | 220 |
| 4 | 48 | 20 | 10 | 80 | 31 | 3.1 | 56 | 48.9 | 26.3 | 39.0 | 14.0 | 243 |
| 5 | 48 | 20 | 10 | 100 | 33 | 3.1 | 61 | 41.0 | 18.7 | 33.8 | 13.0 | 290 |
| 6 | 48 | 20 | 10 | 120 | 39 | 3.1 | 67 | 36.2 | 17.9 | 35.1 | 13.5 | 315 |
| 7 | 48 | 20 | 10 | 140 | 42 | 3.1 | 74 | 35.0 | 18.3 | 33.0 | 14.0 | 350 |
| 8 | 48 | 20 | 10 | 160 | 50 | 3.1 | 83 | 25.5 | 17.1 | 32.1 | 13.0 | 405 |
| 9 | 60 | 10 | 8 | 170 | 35 | 3.2 | 98 | 20.0 | 17.5 | 31.5 | 12.5 | 390 |
| 10 | 60 | 10 | 8 | 200 | 63 | 3.2 | 115 | 16.7 | 18.3 | 31.0 | 13.6 | 425 |
| 11 | 30 | 20 | 30 | 20 | 20 | 3.1 | 25 | 127.3 | 35.8 | 64.0 | 12.0 | 86 |
| 12 | 48 | 20 | 10 | 40 | 25 | 3.1 | 44 | 73.2 | 30.2 | 75.0 | 41.0 | 220 |
| 13 | 48 | 20 | 10 | 100 | 32 | 3.1 | 61 | 47.7 | 27.1 | 41.0 | 25.0 | 164 |
| 14 | 48 | 20 | 10 | 140 | 42 | 3.1 | 74 | 39.8 | 20.7 | 31.0 | 20.0 | 238 |
| 15 | 60 | 10 | 8 | 160 | 50 | 3.2 | 183 | 27.9 | 18.3 | 31.0 | 10.0 | 256 |
| 16 | 30 | 20 | 30 | 20 | 15 | 3.0 | 25 | 95.5 | 23.9 | 28.5 | 2.5 | 25.7 |
| 17 | 48 | 20 | 10 | 40 | 20 | 3.1 | 44 | 67.9 | 21.5 | 45.0 | 4.4 | 42 |
| 18 | 48 | 20 | 10 | 100 | 24 | 3.1 | 61 | 48.5 | 18.3 | 33.0 | 5.5 | 44 |
| 19 | 48 | 20 | 10 | 140 | 30 | 3.1 | 74 | 42.2 | 16.7 | 32.0 | 4.5 | 44 |
| 20 | 60 | 10 | 8 | 160 | 38 | 3.1 | 83 | 30.2 | 15.1 | 31.0 | 5.6 | 56 |

⊥ normal direction
= parallel direction normal to the surface of the magnetic recording material whereas the word "parallel" is used for values taken in a direction parallel to the surface of the magnetic recording material.

Example 2

Starting from aluminum foils the same as those used in Example 1, five samples Nos. 11 to 15 were prepared varying the period of immersion at pore diameter enlargement. Anodic oxidation and pore diameter enlargement were carried out in a manner same as that employed in Example 1. The period of immersion was changed from 20 to 160 min. in these five samples.

Packing of ferromagnetic substance (50 Fe—50 Co alloy) was carried out in an electrolytic solution containing 20 g/l of iron sulfate, 30 g/l of cobalt sulfate, 30 g/l of boric acid and 2 g/l of glycerin. The PH of the electrolytic solution was adjusted to 6.0.

Like Example 1, coersive force Hc, residual magnetic flux density Br and saturated magnetic flux density Bs, all in the normal and parallel directions, were measured and the obtained results are shown in Table 1.

Figure 3:
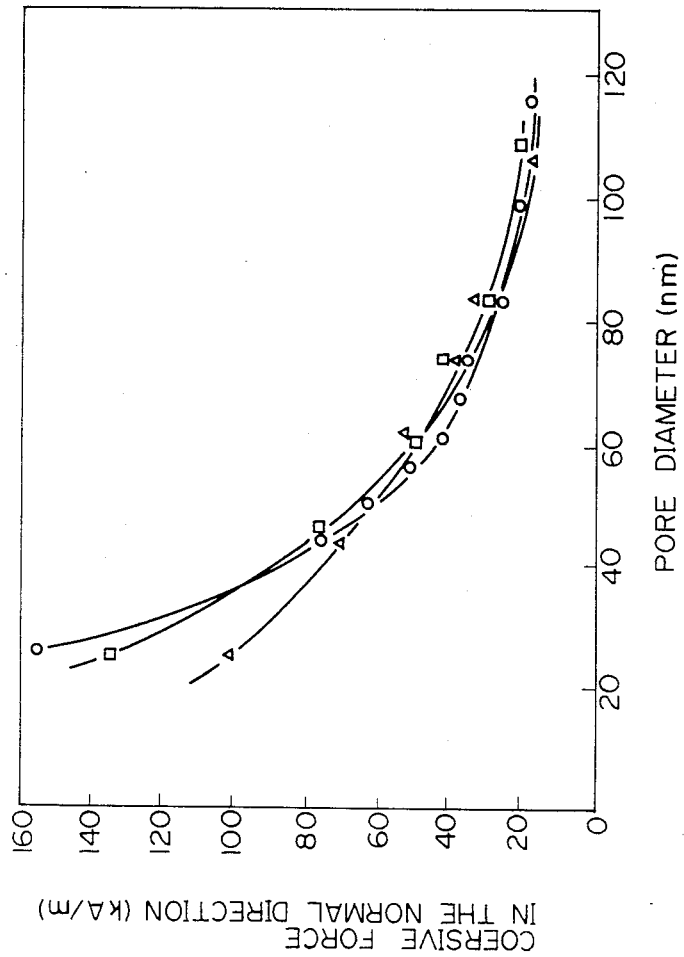
FIG. 3 is a graph for showing the relationship between the diameter of the micro pores in the anodic oxide surface layer and the coercive force of the magnetic recording material in the normal direction.
Figure 4:
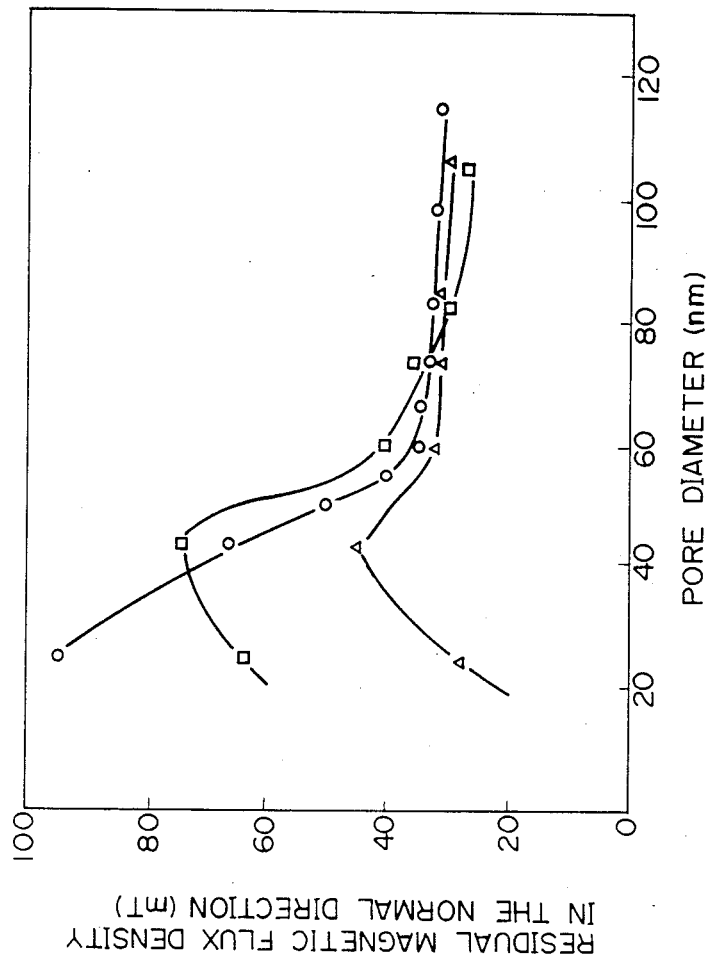
FIG. 4 is a graph for showing the relationship between the diameter of the micro pores in the anodic oxide surface layer and the residual magnetic flux density of the magnetic recording material in the normal direction.

FIG. 3 indicates the relationship between the diameter of the micro pores after the enlargement and the coersive force in the normal direction and FIG. 4 indicates the relationship between the diameter of the micro pores after the enlargement and the residual magnetic flux density in the normal direction, data being taken from Table 1. In the drawings, the lines (—O—) corresponds to Fe, the lines (—□—) corresponds to 50Fe—50Co alloy and the lines (—△—) corresponds to 50Fe—50Ni alloy.

It is clear from the graphical representations that the coercive force and the residual magnetic flux density in the normal direction both vary with slow curves in general as the pore diameter increases, admittedly somewhat in different modes depending on the kind of the ferromagnetic substance to be packed in the micro pores. It is particularly seen in FIG. 3 that the coercive force in the normal direction amounts to about 32 to about 120 kA/m (kiloamperes per meter) when the pore diameter varies from 30 to 75 nm.

It was also confirmed by other tests conducted by the inventor of the present invention that any Ni content beyond 50% by weight in the Fe—Co—Ni alloy packed makes the residual magnetic flux density in the normal direction smaller than 30 mT (milliteslas), which value disenables generation of a sufficiently large reproduction output. Any Co content beyond 50% by weight in the Fe—Co—Ni alloy packed makes the magnetic recording material exhibit too large coercive force and residual magnetic flux density to be used for high density magnetic recording.

Figure 5:
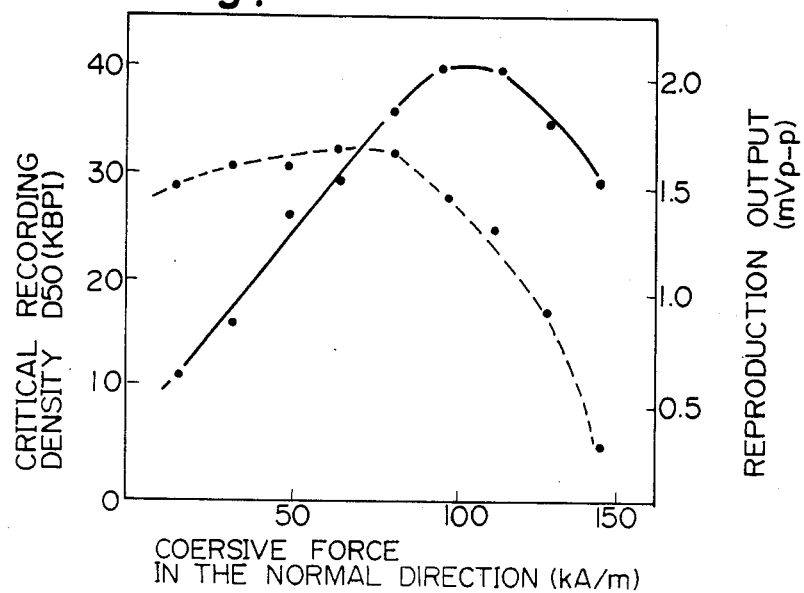
FIG. 5 is a graph for showing the relationships between the coercive force in the normal direction and the critical recording density and the reproduction output, respectively.

Next, the inventigation was focussed on the reproducing characteristics of the magnetic recording material. In each test, the magnetic recording material was provided with anodic oxide layer of 1.5 μm thickness and having micro pores packed with Fe. The width of the track on the magnetic recording material was 160 μm, the head gap was 0.5 μm, the relative speed between the magnetic recording material and the magnetic head was 5 m/s and scanning was carried out for 13×2 turns. The results are shown in FIG. 5, in which the solid line is for the critical recording density and the dot line is for the reproduction output.

As is clear in the illustration, the critical recording density increases significantly and almost linearly as the coercive force in the normal direction increases. The reproduction output also exhibits an increase following an increase in the coercive force in the normal direction. However, the reproduction output and the critical recording density both falls significantly as the coercive force in the normal direction exceeds about 120 kA/m. This indicates the fact that, in the case of a narrow head gap for recording of about 40 KBPI density, magnetic saturation occurs at the tip of the magnetic head to hamper smooth and sufficient high density recording of information. Any coercive force in the normal direction ness. This is believed to come from the fact that, at high density recording of about 1.5 μm wave length, magnetization in the normal direction by signals is effective in the section of the magnetic recording material close to its surface only and magnetization in the parallel direction occuring in sections remote from the surface degrades the magnetic recording characteristics of the material. Although the illustrated example is for a coercive force of 80 kA/m, similar trend was observed for coercive forces in a range from 16 to 144 kA/m. Further, presence of similar trend was confirmed in case 50Fe—50Co alloy or 50Fe—50Ni alloy was used for packing of the micro pores.

EXAMPLE 4

Thirteen samples Nos. 21 to 33 were prepared from alminum foils same as those used in Example 1 by varying the period of immersion at enlargement of the micro pore diameter.

Anodic oxidation was carried out using a solution same as that in Example 1 but under different process conditions.

Pore diameter enlargement was carried out in a solution bath same as that in Example 1 but under different process conditions. The temperature of the bath was kept at 30° C. and the period of immersion was changed from 16 to 85 min in these thirteen samples.

Packing of ferromagnetic substance (Fe) was carried out in an electrolytic solution same as that in Example 1 but with different periods. The PH of the electrolytic solution was adjusted to 4.0.

Measured indices are given in Table 2.

TABLE 2

| sample No. | Anodic oxidation | | | period of electrolysis at pore diameter enlargement (min) | period of electrolytic deposition at packing (min) | mechanical properties | | mechanical characteristics | | | | |
|---|---|---|---|---|---|---|---|---|---|---|---|---|
| | voltage (V) | temperature (°C.) | period (min) | | | thickness of anodic oxide layer (μm) | cell diameter (nm) | HC (kA/m) ⊥ | (kA/m) = | Br (mT) ⊥ | (mT) = | Bs (mT) |
| 21 | 38 | 20 | 18 | 16 | 15 | 3.0 | 90 | 86.7 | 27.1 | 69 | 15 | 195 |
| 22 | 25 | 20 | 40 | 29 | 30 | 3.0 | 64 | 77.6 | 28.6 | 59 | 15 | 240 |
| 23 | 20 | 20 | 50 | 31 | 56 | 3.0 | 55 | 71.6 | 23.9 | 56 | 19 | 280 |
| 24 | 60 | 10 | 8 | 19 | 12 | 3.0 | 132 | 44.6 | 20.7 | 44 | 11 | 230 |
| 25 | 38 | 20 | 18 | 31 | 27 | 3.0 | 90 | 54.1 | 18.3 | 44 | 12 | 280 |
| 26 | 34 | 20 | 25 | 33 | 30 | 3.0 | 82 | 51.7 | 19.1 | 40 | 12 | 285 |
| 27 | 20 | 20 | 50 | 43 | 50 | 3.0 | 55 | 55.7 | 15.1 | 25 | 17 | 250 |
| 28 | 70 | 10 | 4 | 40 | 18 | 3.0 | 150 | 38.2 | 19.9 | 33 | 6 | 200 |
| 29 | 60 | 10 | 8 | 43 | 22 | 3.0 | 132 | 37.4 | 12.7 | 32 | 8 | 260 |
| 30 | 38 | 20 | 18 | 55 | 42 | 3.0 | 90 | 28.6 | 12.7 | 8 | 6 | 120 |
| 31 | 70 | 10 | 4 | 80 | 35 | 3.0 | 150 | 21.5 | 15.1 | 18 | 12 | 220 |
| 32 | 60 | 10 | 8 | 82 | 47 | 3.0 | 132 | 21.5 | 7.8 | 24 | 5 | 330 |
| 33 | 48 | 20 | 10 | 85 | 58 | 3.0 | 110 | 23.9 | 9.5 | 20 | 10 | 310 |

⊥ normal direction
= parallel direction below 32 kA/m makes the critical recording density smaller than 15KBPI which value mars the operating characteristics of the magnetic recording material in actual use.

Study was also directed to the influence of the thickness of the anodic oxide layer on these indices. For each test, a magnetic recording material of 80 kA/m coercive force in the normal direction was used. The results are shown in FIG. 6, in which the solid line is for the critical recording density and the dot line is for the reproduction output.

Figure 6:
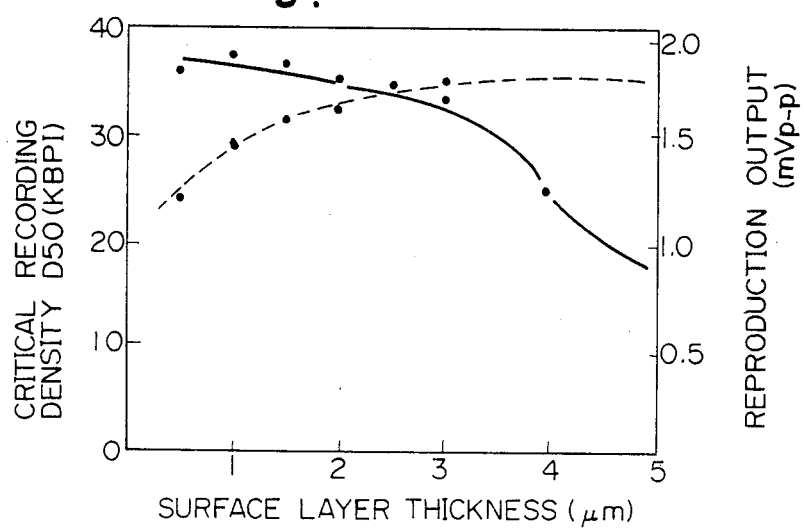
FIG. 6 is a graph for showing the relationships between the thickness of the anodic oxide surface layer and the critical recording density and the reproduction output, respectively.
Figure 7A:
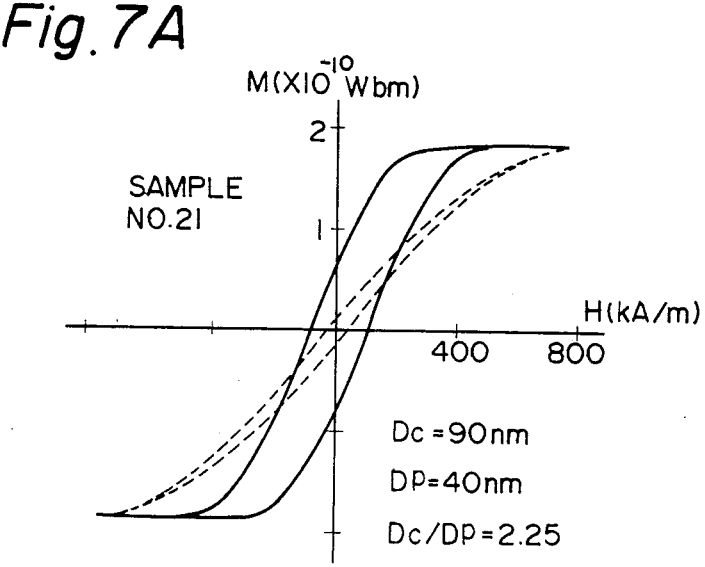
Figure 7B:
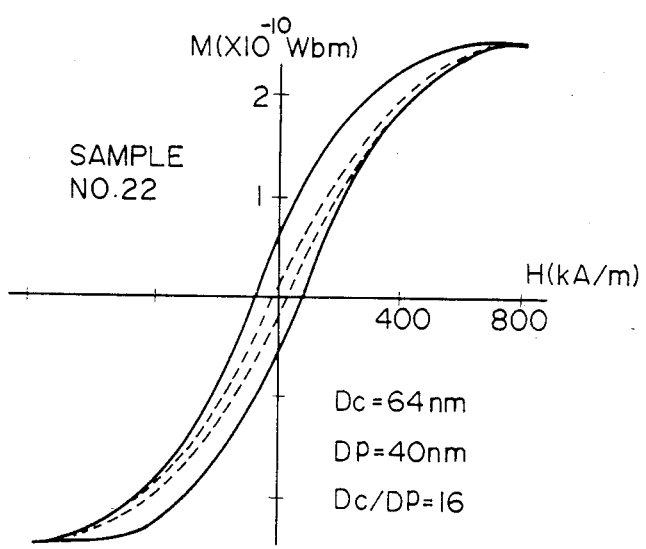
Figure 7E:
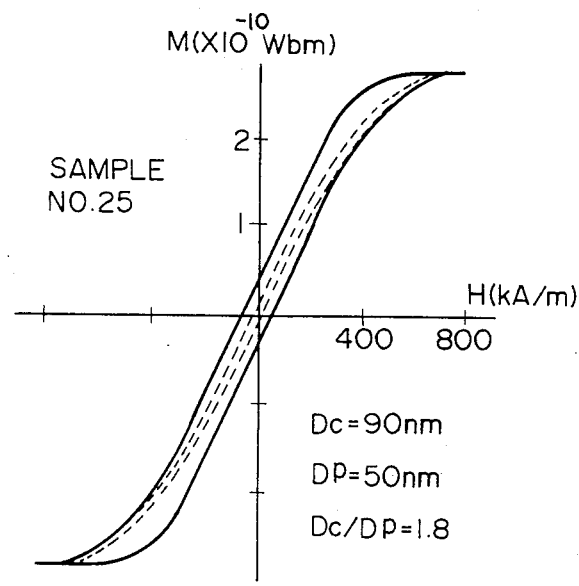
Figure 7F:
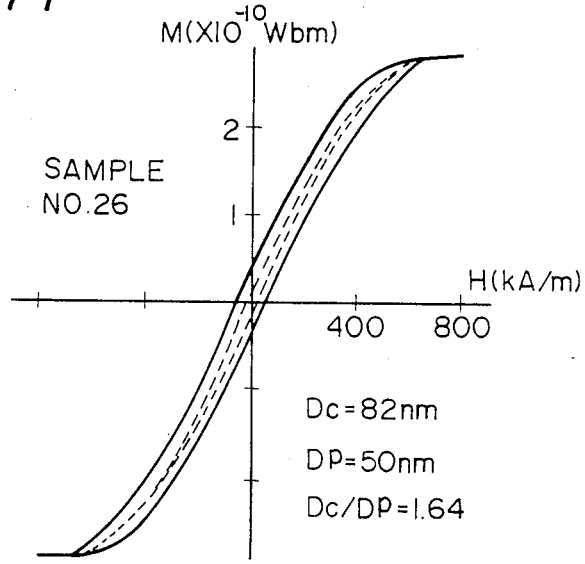
Figure 7I:
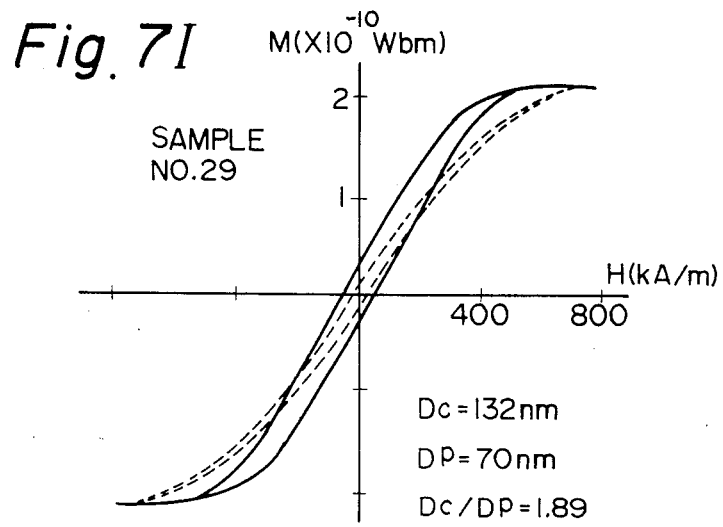
Figure 7J:
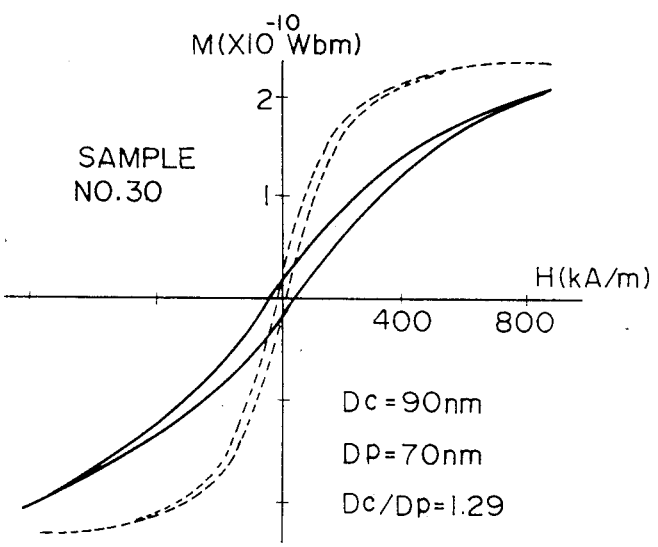
Figure 7K:
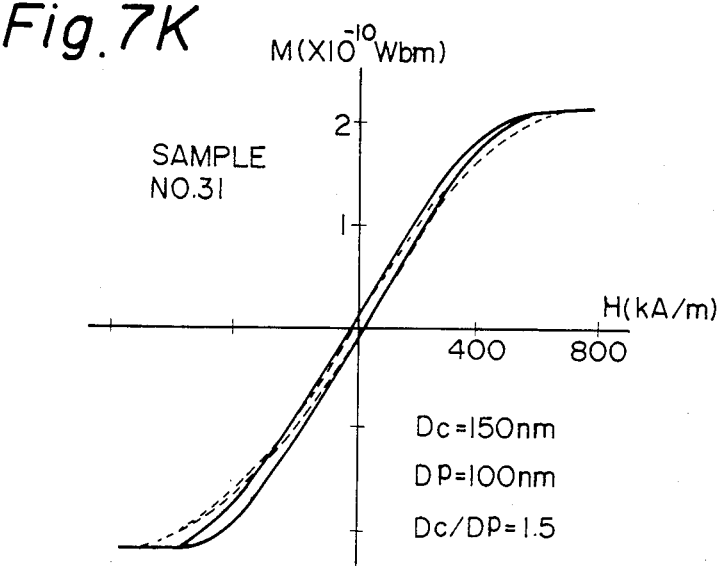
Figure 7L:
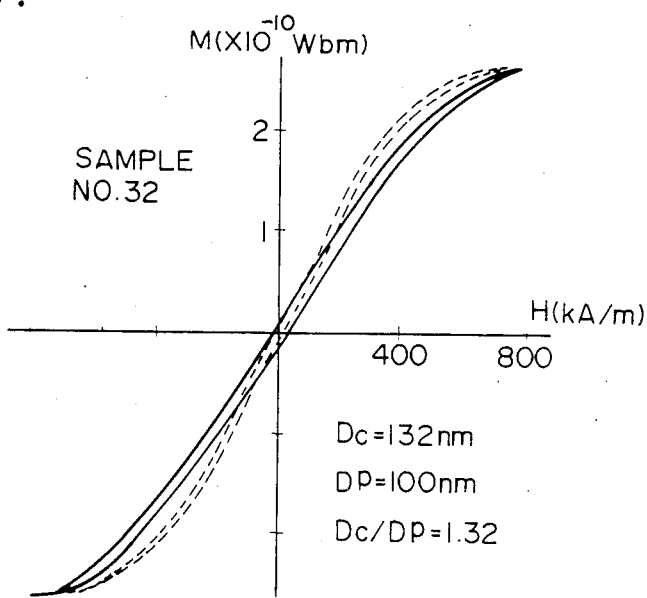
Figure 7M:
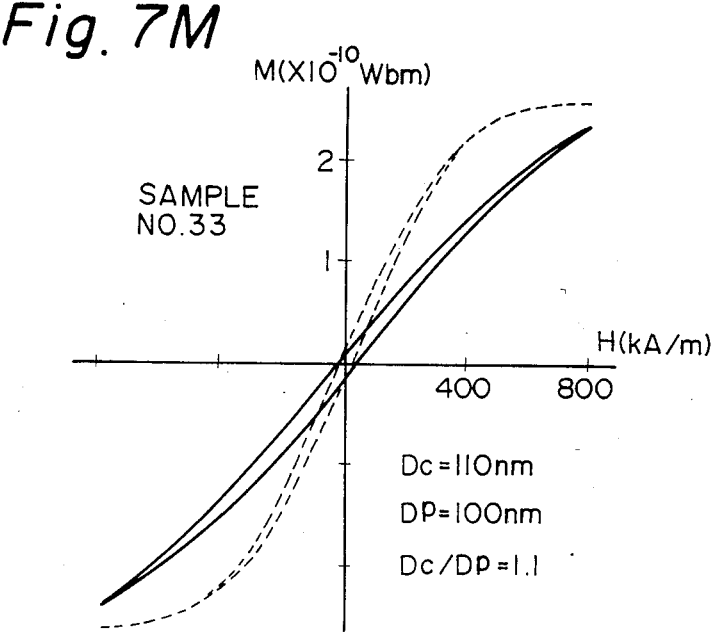

It is seen in FIG. 6 that the reproduction output increases as the surface layer thickness increases, but exhibits a saturation when the surface layer thickness exceeds 3 μm. Significant decrease in the critical recording density also starts at 3 μm surface layer thickness.

As a substitute for Fe used for these samples, Fe—Co—Ni alloy including 50% or more of Fe may be packed in the micro pores.

For appreciation of magnetizing characteristics, magnetized films of 3.0 μm thickness were formed on both surfaces of each sample and a circular disc of 6.0 mm diameter was stamped out of the magnetized sample. Six circular discs were superimposed to form a sample piece. Within a magnetic field of H intensity, the sample piece was placed in vertical and horizontal positions for measurement of the magnetic moment M. The magnetic flux density B in tesla which is weber per square meter is given by dividing the magnetic moment M in weber-meter by the total volume in cubic meter of the magnetized film on the sample pieces. Hysteresis curves taken for the sample pieces are shown in FIGS. 7A to 7M, in which solid lines are for the vertical position and dot lines are for the horizontal position. For each sample, the cell diameter (Dc), the pore diameter (Dp) and the ratio of the cell diameter with respect to the pore diameter (Dc/Dp) are also given in the graph. In the drawings, the coercive force H in kA/m is taken on the abscissa and the magnetic moment M in $10^{-10}$Wb·m is taken on the ordinate. It is clearly indicated by the graphs that hysteresis behavior for the vertical and horizonal positions of the magnetic recording material varies significantly depending on the cell diameter (Dc), the pore diameter (Dp) and their ratio 8(Dc/Dp).

According to a series of separate tests, the coercive force (Hc), the residual magnetic flux density (Br) and the saturated magnetic flux density (Bs) all have similar trends when the thickness of the anodic oxide surface layer varies in the range from 0.5 to 5.0 μm.

Figure 9:
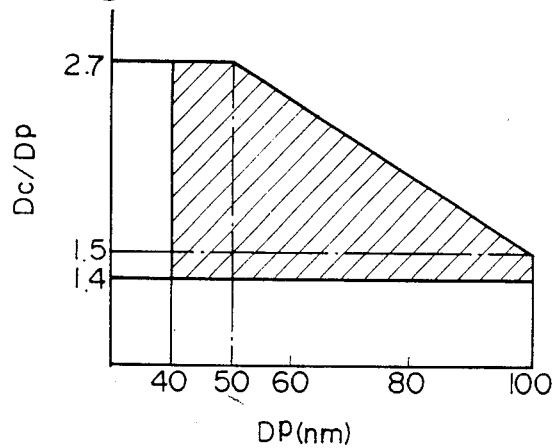
FIG. 9 is a graph for showing the optimum range of the ratio of the cell diameter with respect to the pore diameter.
Figure 8A:
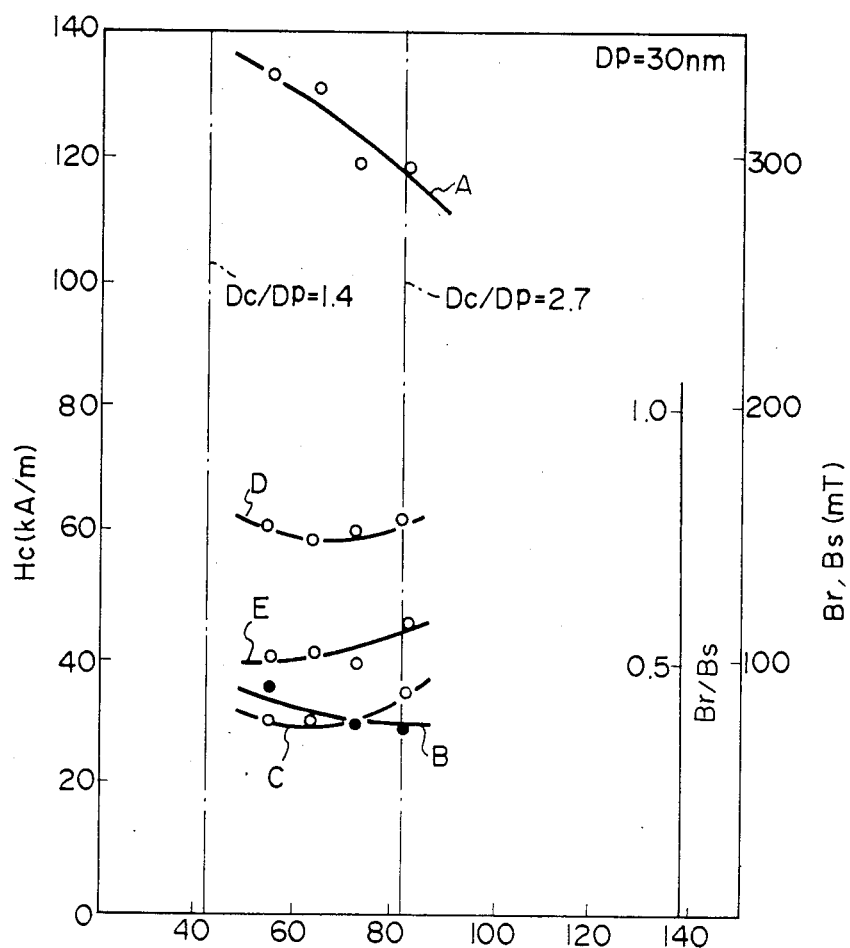
FIGS. 8A to 8E are graphs for showing the relationships between various magnetic indices of the magnetic recording material and the cell diameter for various pore diameters.
Figure 8B:
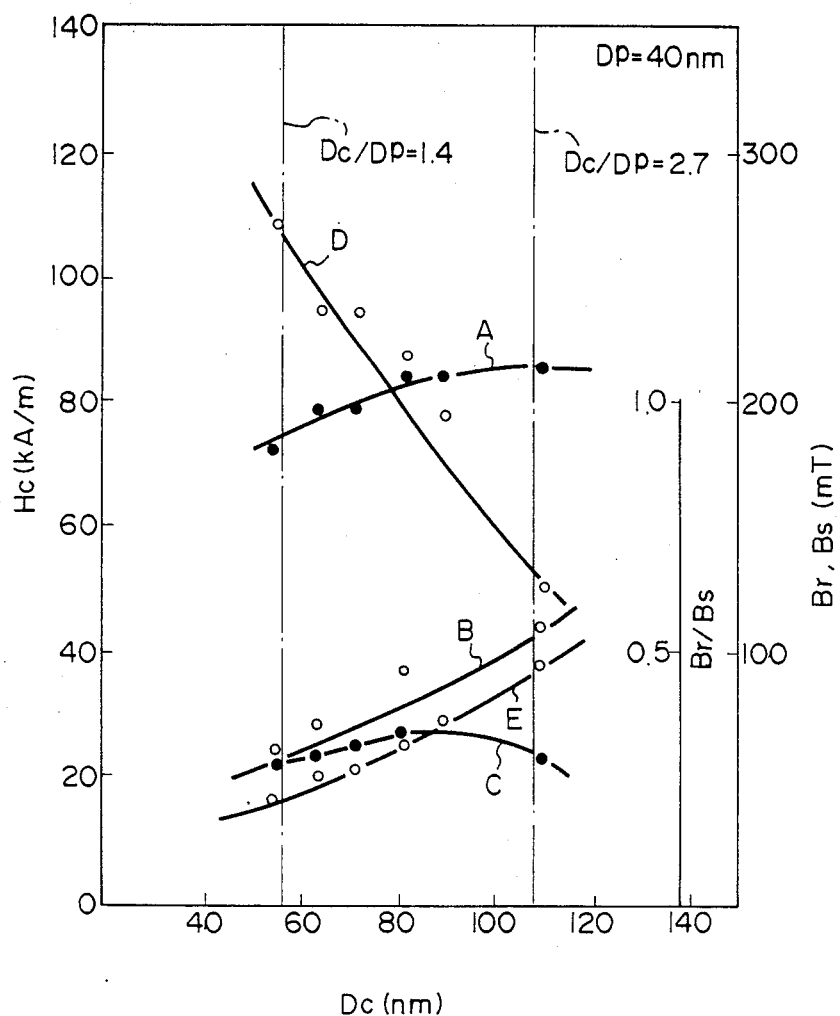
Figure 8C:
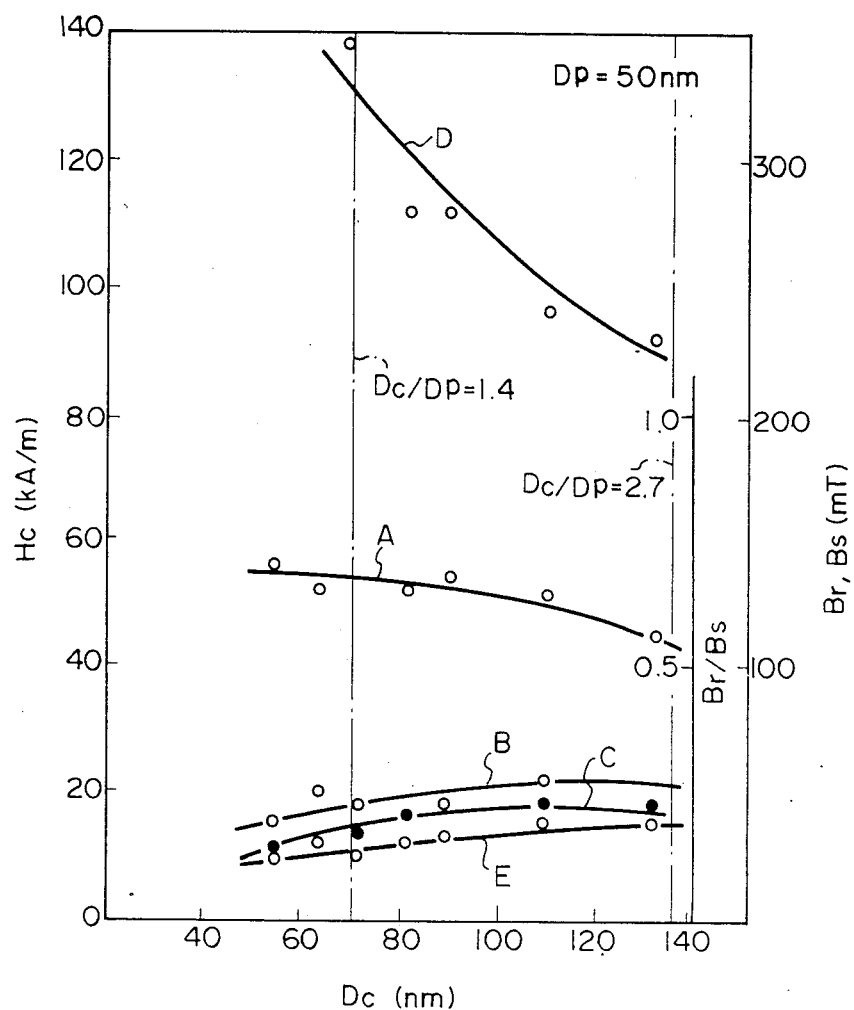
Figure 8D:
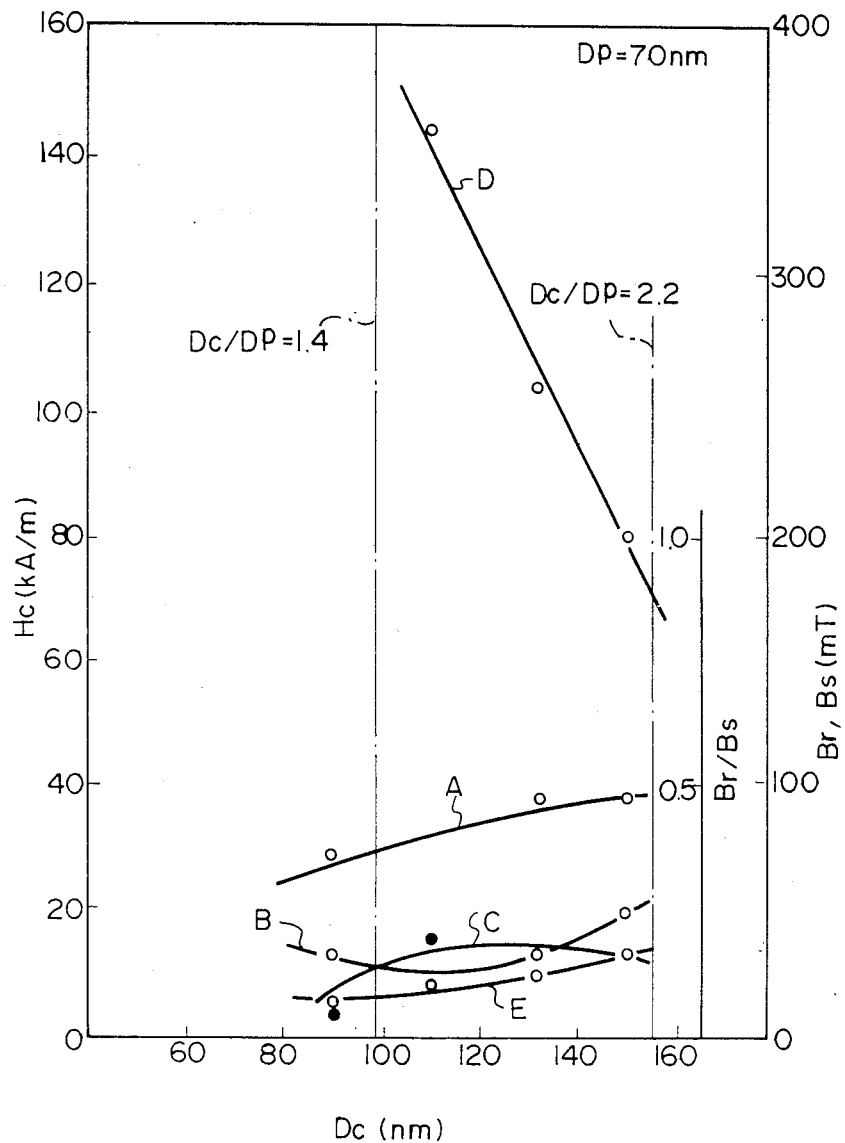
Figure 8E:
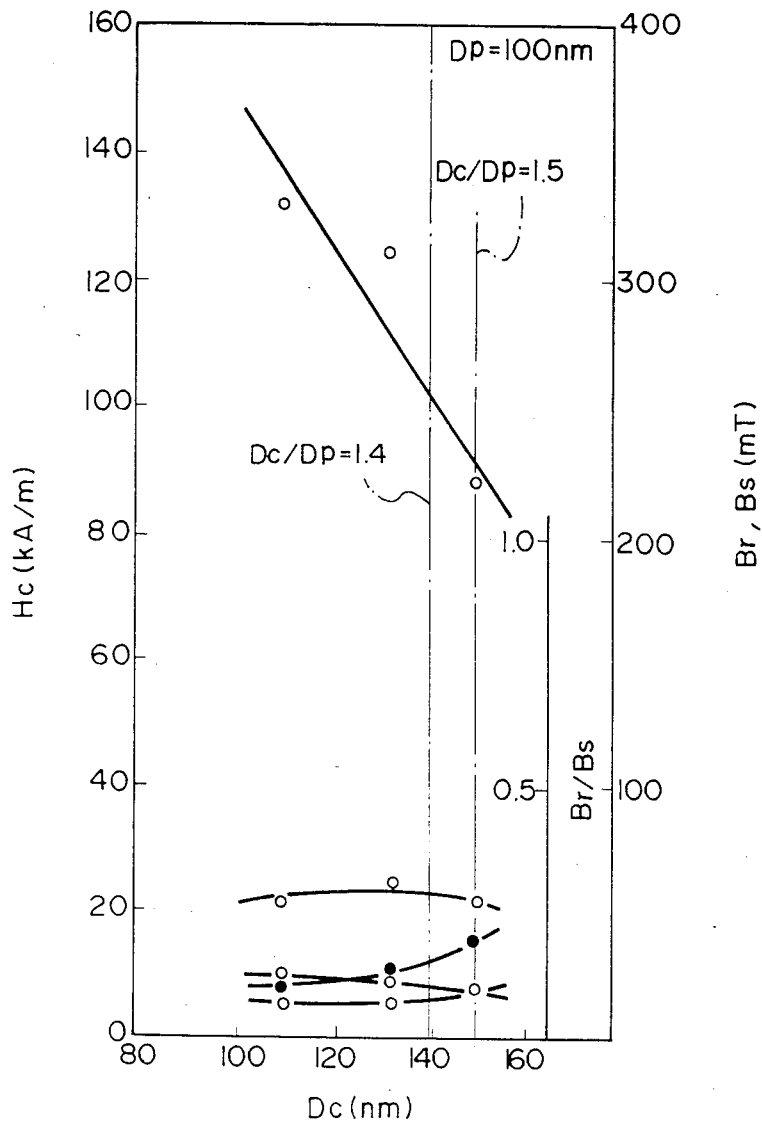

Changes in magnetic characteristics of the magnetic recording material following change in cell diameter are shown in FIGS. 8A to 8E. In the graphs, curves A are for the coercive force in the normal direction (Hc⊥), curves B are for the coercive force in the parallel direction (Hc=), curves C are for the residual magnetic flux density (Br), curves D are for the saturated magnetic flux density (Bs) and curves E are for the ratio of the residual magnetic flux density ih respect to the saturated magnetic flux density (Br/Bs). From these data, it is learned that ideal magnetic characteristics for high density recording is obtained when the ratio of the cell diameter with respect to the pore diameter falls within the shaded area in FIG. 9.

EXAMPLE 5

Two groups of samples Nos. 40 to 49 and Nos. 50 to 62 were prepared with difference in electric voltage at anodic oxidation.

For each sample, an aluminum foil (H18) of 99.99% purity and 95 μm thickness was used. The size of the foil was 3 cm×4 cm., and the surface area of treatment was 0.26 dm$^2$.

As a pretreatment, the foil was first subjected to alkali etching in a sodium hydroxide solution of 5% concentration for 10 sec. at 80° C., which was followed by washing with pure water. Next, the foil was subjected to neutralization in a nitric acid solution of 5% concentration for 1 min. at the room temperature, which was again followed by washing with pure water.

Anodic oxidation was carried out using an oxalic acid solution of 3% by weight of concentration at 20° C. In the electrolytic solution bath, each foil was sandwiched by a pair of carbon cathodes. Different electric voltages were used for samples of different groups. For the samples of the first group (Nos. 40 to 49), the electric voltage was 38 V, which corresponds to a cell diameter of 90 nm. Whereas, for the samples of the second group (Nos. 50 to 62), the electric voltage was 48 V, which corresponds to a cell diameter of 110 nm. In either cases, an anodic oxide surface layer of 3 μm thickness was developed on the foil.

Pore diameter enlargement was carried out by immersing each foil in a solution bath containing 5% by weight of sulfamic acid and 1% by weight of phosphoric acid at 30° C. Different periods of immersion were employed for samples of different groups. The samples of the first group (Nos. 40 to 49) were immersed for 19 min in order to obtain a pore diameter of 42 nm and a pore occupation rate (α) of 19.8%. The samples of the second group (Nos. 50 to 62) were immersed for 69 min. in order to obtain a pore diameter of 80 nm and a pore occupation rate (α) of 48%.

Concurrently with the above-described treatment for pore diameter enlargement, each foil was subjected to electrolysis with an electric current of about 23 mA/dm$^2$. This was for the purpose of promoting solution of the barrier layer underneath the anodic oxide surface layer on the foil. The electrolytic voltage dwindled as the electrolysis advances. When the electrolytic voltage reached a certain prescribed value, the mode of process was converted to electrolysis with a constant electric voltage. The above-described value of the electrolytic voltage is hereinafter referred to as "the barrier adjusting voltage". After about 2 min. when the electric current was stabilized, electrolysis was ceased.

Packing of ferromagnetic substance (Fe) was carried out in an electrolytic solution bath containing 0.2 mol/l of Mohr's salt (FeSO$_4$(NH$_4$)$_2$SO$_4$.6H$_2$O), 30 g/l of boric acid. The temperature of the bath was set to 20° C. and the PH was adjusted to be in a range from 3.6 to 3.7. Incompletely rectified alternating current was used while monitoring the Lissajous' figure by using an a oscilloscope. The negative side peak current was kept at 260 mA with a density of 1.0 A/dm$^2$. The positive side peak current was adjusted to a value which stabilized the Lissajous' figer, the value being about 60 to 70 mA.

Change in thickness of the barrier layer was checked by electromicroscopic observation as the barrier adjusting voltage was changed.

For appreciation of the magnetic characteristics, circular discs of 6 mm diameter were stamped out of each foil and six circular discs were superimposed in order to form a sample piece. The values of the residual magnetic flux density Br and the saturated magnetic flux density Bs were measured using the sample pieces.

Assuming that pure Fe was packed in the micro pores, the rate of packing was calculated as follows;

$$\text{Rate of packing} = \frac{\text{saturated magnetic flux density of sample piece}}{(\text{saturated magnetic flux density of pure Fe}) \times (\text{pore occupation rate})} \times 100$$

saturated magnetic flux density = 2.15 tesla of pure Fe

The obtained results are shown in Table 4, in which the symbols (o) and (x) used for mode of colouring indicate the modes as shown in Table 3.

TABLE 3

| | o | x |
| --- | --- | --- |
| Uniformity | even | uneven |
| Electric stability | stable | unstable |
| Gas evolvement | not evolved | evolved |
| Granular deposits | absent | present |

TABLE 4

| Sample No. | Barrier adjusting voltage (V) | Thickness of barrier layer (nm) | Mode of colouring — Uniformity | Electric stability | Gas evolvement | Granular deposits | Rate of packing (%) | Hc (kA/m) upper/lower | Br (mT) upper/lower | Bs (mT) upper/lower | Br/Bs upper/lower |
|---|---|---|---|---|---|---|---|---|---|---|---|
| 40 | 4 | 5.6 | X | X | X | O | 8 | 61.7 / 36.8 | 7.5 / 5.7 | 34.8 / 36.0 | 0.216 / 0.158 |
| 41 | 6 | 8.4 | O | O | O | O | 49 | 80.1 / 25.4 | 64.8 / 11.7 | 204.8 / 208.6 | 0.316 / 0.056 |
| 42 | 8 | 11.2 | O | O | O | O | 48 | 83.0 / 30.9 | 65.1 / 13.3 | 200.4 / 203.5 | 0.325 / 0.065 |
| 43 | 10 | 14.0 | O | O | O | O | 53 | 78.1 / 27.4 | 68.0 / 12.8 | 223.7 / 227.5 | 0.304 / 0.056 |
| 44 | 12 | 16.8 | O | O | O | O | 54 | 78.2 / 26.3 | 68.6 / 12.4 | 226.3 / 230.1 | 0.303 / 0.054 |
| 45 | 14 | 19.6 | O | X | X | O | 46 | 76.6 / 22.9 | 59.4 / 9.8 | 195.3 / 197.8 | 0.304 / 0.050 |
| 46 | 16 | 22.4 | O | X | X | O | 46 | 76.0 / 21.7 | 59.7 / 8.8 | 197.8 / 201.0 | 0.302 / 0.044 |
| 47 | 18 | 25.2 | O | X | X | X | 46 | 78.6 / — | 61.7 / — | 196.3 / — | 0.310 / — |
| 48 | 20 | 28.0 | O | X | X | X | 47 | 79.6 / — | 63.6 / — | 198.1 / — | 0.320 / — |
| 49 | 24 | 33.6 | X | X | X | X | 18 | 78.6 / — | 30.9 / — | 75.3 / — | 0.410 / — |
| 50 | 2 | 2.8 | X | X | X | X | 4 | — / — | — / — | 35.2 / 39.5 | — / — |
| 51 | 3 | 4.2 | O | X | O | O | 22 | 19.4 / 10.4 | 8.3 / 9.0 | 212.0 / 228.0 | 0.039 / 0.039 |
| 52 | 4 | 5.6 | O | X | O | O | 34 | 21.9 / 8.4 | 15.1 / 11.1 | 322.5 / 348.8 | 0.047 / 0.032 |
| 53 | 6 | 8.4 | O | O | O | O | 49 | 21.4 / 9.8 | 22.8 / 14.2 | 478.4 / 506.2 | 0.048 / 0.028 |
| 54 | 8 | 11.2 | O | O | O | O | 47 | 20.9 / 9.0 | 21.6 / 13.0 | 463.0 / 485.0 | 0.047 / 0.027 |
| 55 | 10 | 14.0 | O | O | O | O | 55 | 21.2 / 10.3 | 22.2 / 16.7 | 540.6 / 568.0 | 0.041 / 0.029 |
| 56 | 12 | 16.8 | O | O | X | X | 41 | 21.7 / 8.8 | 19.1 / 10.8 | 395.0 / 418.0 | 0.048 / 0.026 |
| 57 | 14 | 19.6 | O | O | O | O | 51 | 22.4 / 11.0 | 21.6 / 16.0 | 493.8 / 522.0 | 0.044 / 0.031 |
| 58 | 16 | 22.4 | O | O | X | O | 50 | 22.9 / 11.8 | 24.0 / 16.0 | 503.0 / 518.5 | 0.048 / 0.031 |
| 59 | 18 | 25.2 | O | X | X | X | 52 | 21.6 / 9.0 | 22.8 / 13.9 | 512.3 / 539.0 | 0.045 / 0.026 |
| 60 | 20 | 28.0 | O | X | X | X | 49 | 22.4 / 8.8 | 21.3 / 13.0 | 483.0 / 509.2 | 0.044 / 0.026 |
| 61 | 22 | 30.8 | O | X | X | X | 38 | 22.9 / 8.4 | 15.7 / 9.9 | 361.0 / 387.3 | 0.043 / 0.026 |
| 62 | 24 | 33.6 | X | X | X | X | 5 | — / — | — / — | 43.2 / 47.0 | — / — |

Figure 10:
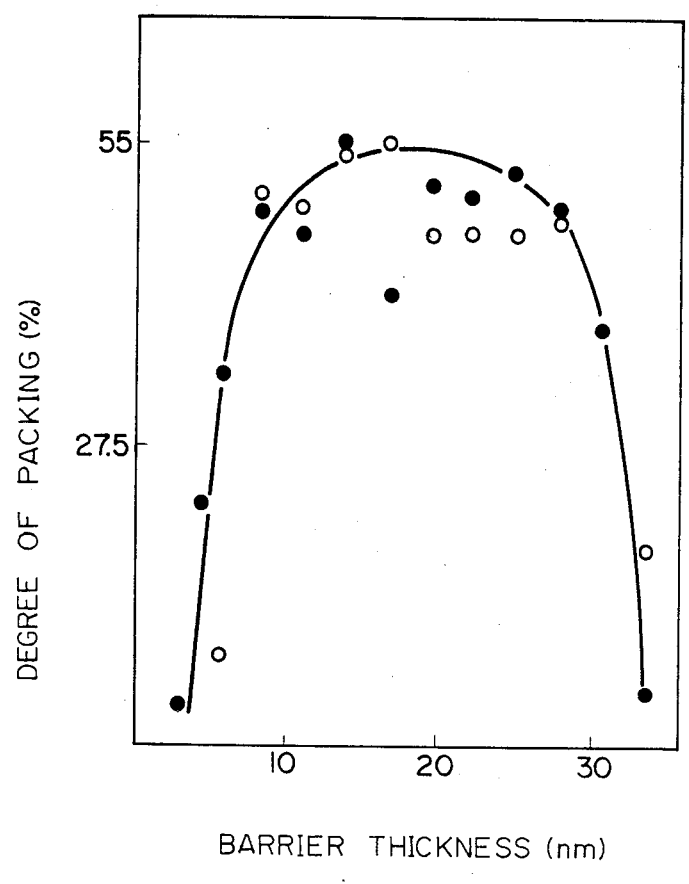
FIG. 10 is a graph for showing the relationship between the thickness of the barrier layer and the rate of packing of the ferromagnetic material.

The relationship between the thickness of the barrier layer and the rate of packing of Fe in the micro pores of the samples is graphically shown in FIG. 10. White circles in the graph are for the samples of the first group in which Dp was 42 nm and Dc was 90 nm. Black circles in the graph are for the samples of the second group in which Dp was 80 nm and Dc was 110 nm. It is clear from the illustration that the rate of packing is largest when the thickness of the barrier layer is in a range from 14 to 18 nm, and that the rate of packing exhibits abrupt fall when the thickness of the barrier layer is either smaller than 8 nm or larger than 28 nm. It is confirmed from the foregoing that preferable packing rate of the ferromagnetic substance is obtained when the thickness of the barrier layer is in a range from 8 to 28 nm.

I claim:

1. An improved magnetic recording material comprising a substrate containing a predominant amount of aluminum, an anodic oxide surface layer located in the surface section of said substrate and provided with a plurality of micro pores each of which extends in the thickness direction of said anodic oxide surface layer and has a diameter in a range of from 40 to 100 nm, the thickness of said anodic oxide surface layer being less than about 3.0 μm, a barrier layer located beneath said anodic oxide surface layer and having a thickness in a range of from 8 to 28 nm, and a ferromagnetic substance packed in said micro pores in said anodic oxide surface layer at a degree of packing of greater than about 41%.

2. An improved magnetic recording material as claimed in claim 1 in which
the diameter of said micro pores is in a range from 40 to 75 nm.

3. An improved magnetic recording material as claimed in claim 1 in which
the ratio of cell diameter (Dc) with respect to pore diameter (Dp) is in a range from 1.4 to 2.7 for pore diameters in a range from 40 to 50 nm, said cell diameter (Dc) referring to the distance between center axes of adjacent micro pores in said anodic oxide surface layer.

4. An improved magnetic recording material as claimed in claim 1 in which
the ratio of cell diameter (Dc) with respect to pore diameter (Dp) is in a range from 1.4 to {2.7−(1.2/50 nm) (Dp−50 nm)} for pore diameters in a range from 50 to 100 nm, said cell diameter (Dc) referring to the distance between the center axes of adjacent micro pores in said anodic oxide surface layer.

5. An improved magnetic recording material as claimed in claim 1 in which
said ferromagnetic substance contains 50% by weight or more of Fe.

6. An improved magnetic recording material as claimed in claim 5 in which
said ferromagnetic substance is chosen from a group consisting of Fe, Fe—Co alloys, Fe—Ni alloys and Fe—Co—Ni alloys.

7. A method for producing an improved magnetic recording material comprising the steps of forming an anodic oxide surface layer having a thickness less than about 3.0 μm and a plurality of micro pores on a foil containing a predominant amount of aluminum by an anodic oxidation process whose condition is adjusted so that a barrier layer is concurrently formed beneath said anodic oxide surface layer; enlarging said micro pores by subjecting said foil to electrolysis in which said electrolysis is first advanced with a small constant electric current, the mode of electrolysis is then converted to one with a constant electric voltage when the electrolytic voltage has dwindled down to a level effective to produce a barrier layer having a thickness in the range of from 8 to 28 nm, and said electrolysis is ceased after an electric current has been established; and packing ferromagnetic substances into said micro pores by electrolytic deposition.

8. A method as claimed in claim 7 in which the process condition of said anodic oxidation is adjusted so that the ratio of cell diameter (Dc) with respect to pore diameter (Dp) is in a range of from 1.4 to 2.7 for pore diameters in a range of from 40 to 50 nm.

9. A method as claimed in claim 7 in which the process condition of said anodic oxidation is adjusted so that the ratio of cell diameter (Dc) with respect to pore diameter (Dp) is in a range of from 1.4 to $$\{2.7-(1.2/50 \text{ nm})(D_p-50 \text{ nm})\}$$

for pore diameters in a range of from 50 to 100 nm.

* * * * *

UNITED STATES PATENT AND TRADEMARK OFFICE
CERTIFICATE OF CORRECTION

PATENT NO. : 4,650,708

DATED : March 17, 1987

INVENTOR(S) : Takahashi

It is certified that error appears in the above-identified patent and that said Letters Patent is hereby corrected as shown below:

Column 5, line 25, change "1.3" to --1.0--.

Column 6, line 10, change "DC" to --Dc--;

line 40, change "bariier" to --barrier--.

Column 8, line 8, change "immerson" to --immersion--.

Column 16, line 6, change "an" to --the-- and "been established" to --stabilized--.

Signed and Sealed this

Sixth Day of October, 1987

Attest:

DONALD J. QUIGG

Attesting Officer

Commissioner of Patents and Trademarks